United States Patent
Anderl

(10) Patent No.: US 7,281,462 B2
(45) Date of Patent: Oct. 16, 2007

(54) TOOL GUIDING DEVICE

(76) Inventor: Johann Anderl, Herman-Schuon-Strasse 9, DE-71640 Ludwigsburg (DE)

( * ) Notice: Subject to any disclaimer, the term of this patent is extended or adjusted under 35 U.S.C. 154(b) by 38 days.

(21) Appl. No.: 10/531,115

(22) PCT Filed: Jan. 5, 2004

(86) PCT No.: PCT/EP2004/000015

§ 371 (c)(1),
(2), (4) Date: Apr. 11, 2005

(87) PCT Pub. No.: WO2004/062901

PCT Pub. Date: Jul. 29, 2004

(65) Prior Publication Data

US 2006/0075868 A1    Apr. 13, 2006

(30) Foreign Application Priority Data

Jan. 11, 2003    (DE) .............................. 103 00 722

(51) Int. Cl.
 *B30B 15/06* (2006.01)
(52) U.S. Cl. ......................................... 83/537; 83/823
(58) Field of Classification Search ................. 83/537, 83/540, 823, 640, 623; 384/49, 29, 30, 32, 384/38
See application file for complete search history.

(56) References Cited

U.S. PATENT DOCUMENTS

| 2,373,541 A | * | 4/1945 | Chelborg et al. ............. 266/76 |
| 3,362,055 A | * | 1/1968 | Bryce ............................. 462/5 |
| 3,852,991 A | * | 12/1974 | Poggio ...................... 72/389.3 |
| 4,099,798 A | * | 7/1978 | Steinmetz ................ 15/236.01 |
| 4,134,716 A |   | 1/1979 | John, Jr. |
| 4,442,694 A |   | 4/1984 | Füsser et al. |
| 5,272,904 A | * | 12/1993 | Krumholz ..................... 72/455 |
| 6,341,243 B1 | * | 1/2002 | Bourne et al. .............. 700/165 |
| 6,474,868 B2 | * | 11/2002 | Geyer et al. ................... 384/49 |

FOREIGN PATENT DOCUMENTS

| DE | 40 01 993 A1 | 7/1990 |
| EP | 0 953 438 A1 | 11/1999 |
| GB | 1195073 | 6/1970 |
| JP | 62267100 | 11/1987 |
| JP | 05309656 | 11/1993 |
| JP | 08259245 | 10/1996 |
| WO | 02/09898 | 2/2002 |

* cited by examiner

Primary Examiner—Stephen Choi
(74) Attorney, Agent, or Firm—Pauley Petersen & Erickson

(57) ABSTRACT

A tool guiding device including a base frame and guiding rails arranged on the base frame so that they are parallel in relation to each other. At least one carriage having a machining tool is guided on the guiding rails in a linearly displaceable manner by a drive device with a carriage connecting element. The tool guiding device of this invention guides the tool in a precise, non-abrasive manner. Thus, the carriage is coupled to the carriage connection by a compensation device including at least one angle compensating element and at least one lateral compensating element.

17 Claims, 2 Drawing Sheets

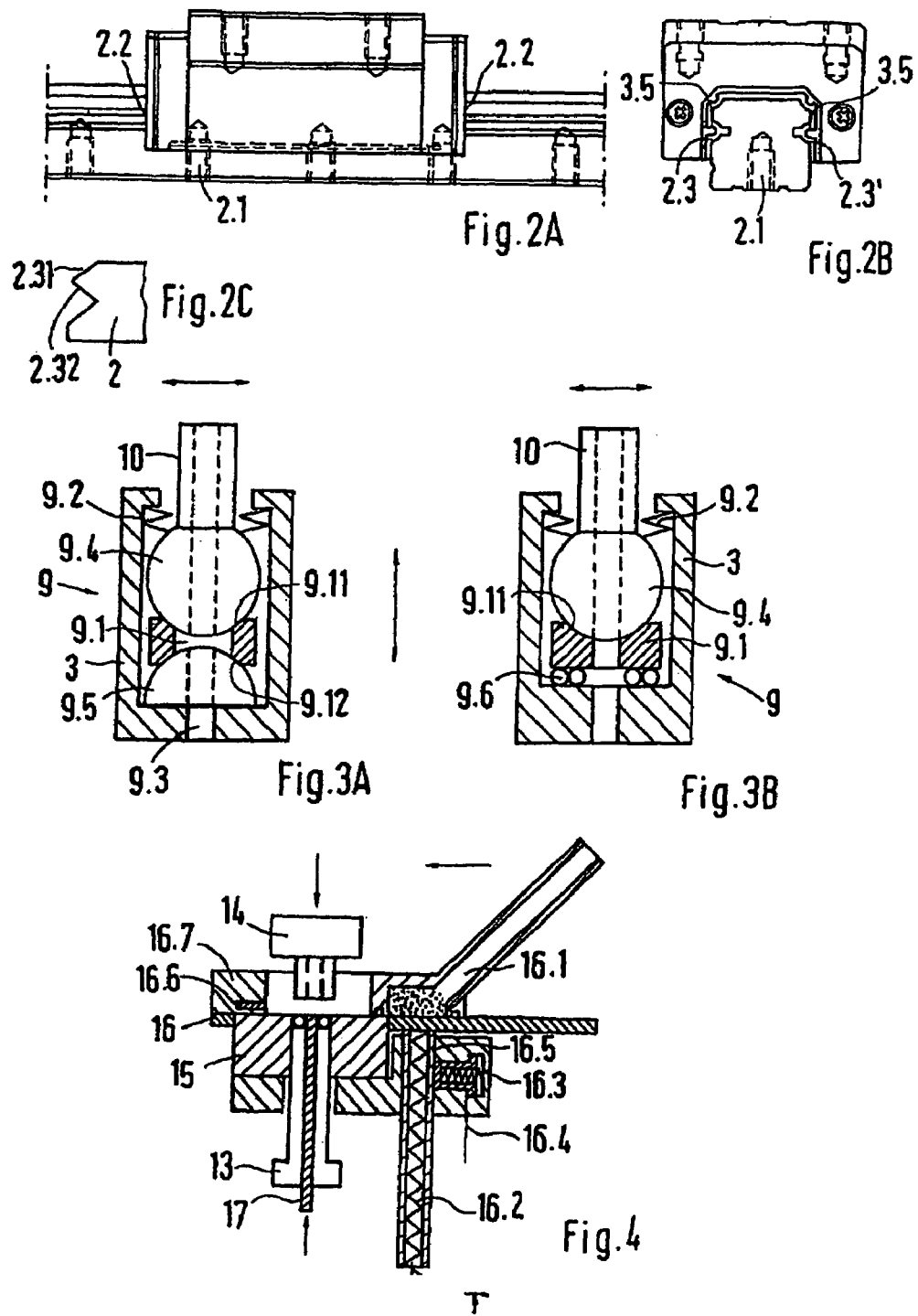

TOOL GUIDING DEVICE

BACKGROUND OF THE INVENTION

1. Field of the Invention

This invention relates to a tool guiding device with a base frame and guide rails, which are parallel relative to each other, arranged thereon, on which at least one carriage has a processing tool displaceably linearly guided via a carriage connector by a drive mechanism.

2. Discussion of Related Art

A known tool guiding device, which for example is used in punch presses for producing punched workpieces, requires very exact guidance of, for example, a lower and an upper pressing tool, for which purpose an upper carriage, on which an upper die is received, and a lower carriage, on which a lower die is received, are guided on guide rails of the base frame, for example on at least two and mostly four guide rails extending parallel with respect to each other. The carriages are coupled via respective carriage connectors to an actuating drive mechanism, by which the carriages can be displaced into a predeterminable height position by a control device. For assuring an exact placement of the lower die and the upper die, the guide rails and the adjustment of the carriages by the carriage connectors and the actuating drive must be matched to each other very accurately in order to keep distortions and tool wear as low as possible.

SUMMARY OF THE INVENTION

One object of this invention is to provide a tool guiding device of the type mentioned above but which has an increase in precision and service life, along with a reduced outlay.

This object can be attained with a carriage coupled to carriage connectors via at least one compensating device having at least one angle compensation element and at least one lateral compensation element.

A stress-free guidance of the carriages extending exactly along the guide rails is achieved with at least one angle compensation element and at least one lateral compensation element between the guide rails and the carriage connector, so that a tool can be conducted very accurately to the treatment location. A long service life of the tools is thus obtained. Also, an exact processing of workpieces is possible, so that finishing work and setup times are minimized.

Advantageous alternative embodiments of the tool guide device are obtained because the angle compensation element is formed as a ball element or ball section element, which is rigidly connected with the carriage connector and is seated, on its side facing away from the carriage connector, in an articulated manner in a ball socket of an intermediate piece. The intermediate piece has a further ball socket on its side facing away from the ball socket, in which a further ball element or ball section element, which is connected with the carriage, is seated in an articulated manner, or on its side facing away from the ball socket, the intermediate piece is seated by a roller, ball or sliding bearing with a plurality of rolling, ball or sliding bodies laterally transversely to the displacement direction of the carriage in the latter.

The guiding of the carriage is accomplished if the carriage is maintained and guided on facing tracks on facing sides of the guide rails by revolving roller or ball units.

Further stabilization and accuracy of guidance is achieved if the respectively oppositely located sides of the guide rails respective pairs of guide tracks are arranged, which in cross section are oriented angled or parallel with each other, on each of which a revolving roller or ball unit rolls off, wherein the two pairs of guide tracks extend parallel with each other in the linear direction.

For increasing the wear resistance, in its two end areas located in the guiding direction, the carriage has strippers, at least near the guide tracks, and for sealing the space between the guide rails and the carriages, sealing elements are provided on the carriages. It is also possible to simply provide lubrication in the sealed space between the carriage and the guide rails. An additional deflection of dirt can be achieved by a pressure buildup in the space.

A very exact, stable alignment of the guide rails, and thus the carriage guidance, is achieved if rail guides for fastening the guide rails are cut into the base frame.

The exterior of the guide rails remains unaffected and can be easily kept free of dirt particles if the guide rails are connected with the base frame from a direction of the side of the base frame.

In one embodiment for processing workpieces, the base frame has a table and two guide rails are attached in a vertical orientation to a vertical section extending from below to above the table, and a gate is formed above the table top in the vertical section between the guide rails, so that access paths to a treatment location of the tool are provided from four horizontal directions. It is easy to introduce pulverulent, liquid, pasty or solid materials into the treatment location through the gate by a suitable feed device via a feeding arm, for example.

In one embodiment, an upper carriage is arranged above the table top, and a lower carriage below the table top.

A further embodiment for treating a workpiece has a passage for an ejector formed in the at least one angle compensation element and at least one lateral compensation element.

Also, for an exact positioning of the tool a measuring pickup of a measuring system is arranged between two guide rails near the respective carriage for adjusting a carriage position.

BRIEF DESCRIPTION OF THE DRAWINGS

This invention is described in view of exemplary embodiments, making reference to the drawings wherein:

FIG. 2A shows a guide rail with a carriage of the tool guiding device, in a lateral view;

FIG. 2B shows the guide rail with the carriage in accordance with FIG. 2A, in a top view in the guidance direction;

FIG. 2C shows a cut-out portion of a different guide rail;

FIG. 3A shows a compensating device of the tool guiding device;

FIG. 3B shows a further embodiment of a compensating device; and

FIG. 4 shows a lateral sectional view of a cut-out portion of the tool guiding device in a table area.

DESCRIPTION OF PREFERRED EMBODIMENTS

Figure 1A:
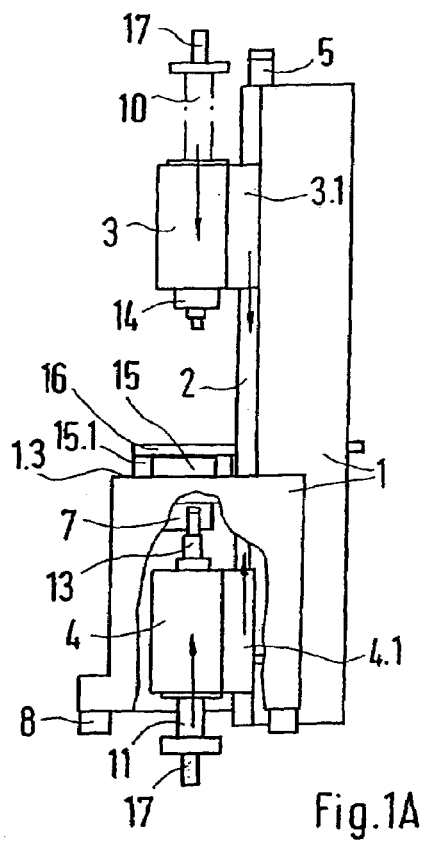
FIG. 1A shows a partially cut-open tool guiding device, in a lateral view.
Figure 1B:
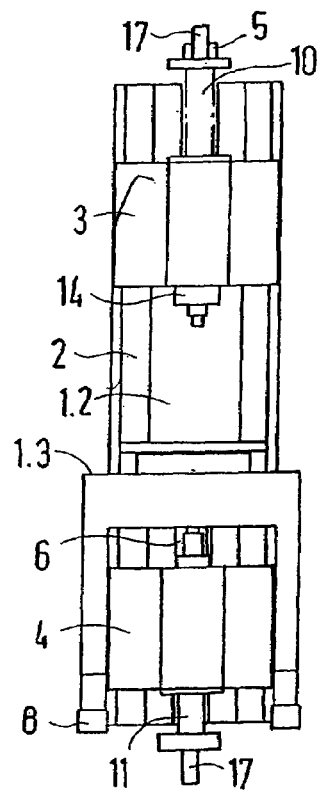
FIG. 1B shows the device in accordance with FIG. 1A, in a front view.
Figure 1C:
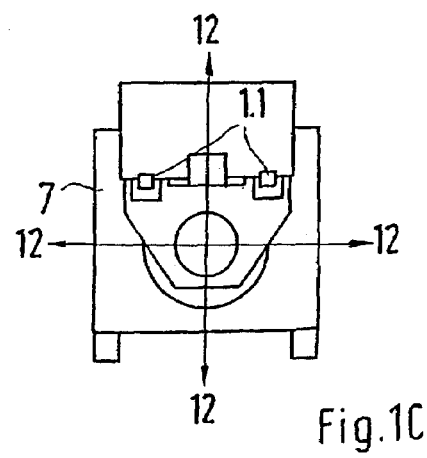
FIG. 1C shows the device in accordance with FIG. 1A, in a top view.

One embodiment of a tool guiding device, such as is used in connection with a punching press, for example, is shown in FIGS. 1A, 1B and 1C. A base frame 1 has a table 1.3 in its lower front area, and in its rear area a vertical section extending upward above the table, to which front side two parallel rail guides 1.1 for guiding an upper carriage 3 and a lower carriage 4 are attached. Here, the guide rails are arranged laterally of a gate 1.2 formed above the table top in the vertical section of the base frame 1 and are attached to rail guides 1.1, which are cut, for example machined, into the vertical section, so that an exactly aligned, rigid and stable connection with the base frame 1 results.

As FIGS. 2A and 2B show, the guide rails 2 are fastened from the direction of the side of the base frame by connection means 2.1 provided on their back, in particular connecting bores and engaging screws. The table is freely accessible from the front and the two sides so that, together with the gate 1.2, access paths 12 to the treatment location result on all sides, and feeding of material, for example pulverulent, liquid, pasty or solid matter, to the treatment location can occur unhampered from the rear, for example via a feed arm, as shown by way of example in FIG. 4.

The upper carriage 3 arranged above the table top, and the lower carriage 4 arranged below the table top are moved into the desired position by an actuating device (not represented) via respective carriage connectors 10 or 11 along the guide paths formed by the guide rails 2. For compensating a not exactly existing parallelism between the actuating device (indicated by large arrows in FIG. 1A) and the orientation of the guide rails 2 (indicated by small arrows in FIG. 1A), respective compensating devices 9 with angle compensation elements 9.4 and lateral compensation elements 9.1, 9.5, 9.6 are formed in the upper carriage 3 and the lower carriage 4 and can be embodied corresponding to the exemplary embodiments in accordance with FIG. 3A or 3B.

In accordance with FIG. 3A, a ball element 9.4 arranged in the upper carriage 3 is rigidly connected with the carriage connector 10, and is seated, articulated in all directions, in an upper ball socket 9.11 of an intermediate piece 9.1, and is maintained by a spring element 9.2 for clamping free of play. On a side facing away from the ball socket 9.11, the intermediate piece 9.1 has a further ball socket 9.12, in which a ball section 9.5, rigidly connected with the housing of the upper carriage 3, is also seated and is articulated in all directions. With the articulated seating and the distance of the ball element 9.4 from the ball section 9.5, the structure results in an angular compensation between the actuating direction and the guide direction of the carriage 3, and also in a lateral compensation as well, such as in the present case in the horizontal direction.

In the exemplary embodiment in accordance with FIG. 3B, the underside of the intermediate piece 9.1 is seated or slidingly conducted on a rolling or ball bearing with individual rollers or balls, so that the angle compensation is achieved by the ball element 9.4 in the ball socket 9.11, and the lateral compensation via the roller or ball bearing, or the sliding guidance.

Guidance errors are compensated with the angle and transverse compensation in accordance with FIGS. 3A and 3B, and distortions of the upper carriage 3, and correspondingly also of the lower carriage 4, in the guide rails are prevented and a highly accurate guidance without undesired transverse forces and bending moments is obtained. Furthermore, carriage guide devices 3.1, 4.1 attached to the upper carriage 3 and the lower carriage 4 contribute to exact guidance and low wear, and roll off by roller running units or rolling running units 3.5 on facing guide tracks 2.3, 2.3' of the guide rails 3 while adjusting the carriages 3, 4. In this case the guide tracks can be arranged as in FIG. 2B or FIG. 2C. With the embodiment in accordance with FIG. 2C, a pair of guide tracks 2.31, 2.32, are arranged at an angle relative to each other and on each of which a prestressed guide unit runs off, and provided on each side of the guide tracks 2. The pairs of guide tracks 2.31, 2.32 extend parallel with each other in the linear direction. The space inside the carriage guide devices 3.1, 4.1 is sealed toward the outside by encircling sealing means and can advantageously be charged with pressure and lubricated with oil. On their end areas located in the running direction, the carriage guide devices 3.1 each have strippers 2.2 for preventing soiling and for maintaining exact guidance properties. It is also possible to provide additional sealing lips and strippers toward the outside.

As FIGS. 1A and 1B show, the upper carriage 3 and the lower carriage 4 have on their facing sides an upper die 14 or a lower die 13 for shaping a workpiece, for example the cutting plate of a chip-removal tool. It is also possible to attach chucks for receiving other tools on the upper die 14 or the lower die 13.

As FIG. 4 shows, a bottom die 15 in the shape of the workpiece is arranged in the table area and can be received, for example, in a chuck 15.1 (see FIG. 1A). For filling, a filler plate arrangement 16 is provided, on which a filler shoe 16.1 for feeding in filler material is arranged. The filler plate can be height-adjusted to be flush with the upper edge of the bottom die by a filler plate adjustment device, so that a gap-free transition to the bottom die is created. Filling without losses takes place via the filler shoe 16.1. The height adjustment takes place via a guide device 16.5 without changing elements with a pressure or gas spring 16.2 or a cylinder drive mechanism. In one operating position, the height position is clamped by a spring and/or a wedge, and can be released pneumatically via an actuating means 16.4. Alternatively, it is possible to have a manually operable clamping and release device. With a sensor arrangement 16.6, which does not need to be reset, it is possible to determine whether any and which press elements are present. Soiling can be removed by blowing off the press elements with a suction device 16.7 automatically after each pressing operation. To be able to produce a tool with an inner contour (for example a hole), a center pin is provided, which can be moved in the axial direction. An evaluating device can also be employed at this location. For a simple operation of the ejector 17, or the center pin, a passage 9.3 is formed in the compensating device, which leads through the ball element 9.4, the intermediate piece 9.1 and the ball section 9.5.

Respective measuring systems 5, 6 are arranged in the vicinity of or near the carriage guide devices 3.1, 4.1 for the exact positioning of the upper carriage and the lower carriage, so that the measurement occurs close to the tools and measuring errors on the basis of an increased measurement distance or amplification via levers are avoided.

The base frame 1 can be exactly adjusted between the external machine shafts (carriage connectors) with leveling devices 8 represented in FIGS. 1A and 1B.

The invention claimed is:

1. A tool guiding device with a base frame (1) and guide rails (2) which are parallel relative to each other arranged on the base frame (1) and at least one carriage (3, 4) having a processing tool (13, 14) displaceably linearly guided via a carriage connector (10, 11) by a drive mechanism, the tool guiding device comprising:

the carriage (3, 4) coupled to the carriage connectors (10, 11) via at least one compensating device (9) having at least one angle compensation element (9.4) and at least one lateral compensation element;

the angle compensation element (9.4) comprising a ball element or a ball section element rigidly connected with the carriage connector (10, 11);

the at least one lateral compensation element including an intermediate piece (9.1) forming a ball socket (9.11), wherein the angle compensation element (9.4) is seated in the ball socket (9.11) of the intermediate piece (9.1);

the intermediate piece (9.1) either forming a further ball socket (9.12) on a side facing away from the ball socket (9.11) in which one of a further ball element and a further ball section element (9.5) connected with the carriage (3, 4) is seated in an articulated manner, or on the side facing away from the ball socket (9.11) the intermediate piece (9.1) is seated on a bearing that is moveable transversely to a displacement direction of the carriage (3.4).

2. The device in accordance with claim 1, wherein the at least one carriage (3, 4) is maintained and guided on facing tracks (2.3, 2.3') on facing sides of the guide rails (2) by roller units.

3. The device in accordance with claim 2, wherein on respectively oppositely located sides of the guide rails (2) respective pairs of the guide tracks (2.31. 2.32) are arranged and in cross section are oriented one of angled and parallel with each other, on each of which is one of the roller units.

4. The device in accordance with claim 3, wherein at two end areas located in a guiding direction the carriage (3, 4) has strippers (2.2) at least in the area of the guide tracks (2.31, 2.32).

5. The device in accordance with claim 4, wherein rail guides (1.1) for fastening the guide rails (2) are cut into the base frame (1).

6. The device in accordance with claim 5, wherein the guide rails (2) are connected with the base frame (1) from a direction of the side of the base frame (1).

7. The device in accordance with claim 6, wherein the base frame (1) has a table (1.3) and two of the guide rails (2) are attached in a vertical orientation to a vertical section extending from below to above the table (1.3), and a gate (1.2) is formed above a table top in a vertical section between the guide rails (2), so that access paths (12) to a treatment location of the tool are provided from four horizontal directions.

8. The device in accordance with claim 7, wherein an upper carriage (3) is arranged above the table top, and a lower carriage (4) is arranged below the table top.

9. The device in accordance with claim 8, wherein a passage (9.3) for an ejector (17) is formed in the at least one angle compensation element (9.4) and at least one lateral compensation element (9.1, 9.5).

10. The device in accordance with claim 9, wherein a measuring pickup of a measuring system (5, 6) is arranged between two guide rails (2) in the area of the respective carriage (3, 4) for adjusting a carriage position.

11. The device in accordance with claim 1, wherein at two end areas located in a guiding direction the carriage (3, 4) has strippers (2.2) at least in an area of guide tracks (2.31, 2.32).

12. The device in accordance with claim 1, wherein rail guides (1.1) for fastening the guide rails (2) are cut into the base frame (1).

13. The device in accordance with claim 1, wherein the guide rails (2) are connected with the base frame (1) from a direction of the side of the base frame (1).

14. The device in accordance with claim 1, wherein the base frame (1) has a table (1.3) and two of the guide rails (2) are attached in a vertical orientation to a vertical section extending from below to above the table (1.3), and a gate (1.2) is formed above a table top in a vertical section between the guide rails (2), so that access paths (12) to a treatment location of the tool are provided from four horizontal directions.

15. The device in accordance with claim 14, wherein an upper carriage (3) is arranged above the table top, and a lower carriage (4) is arranged below the table top.

16. The device in accordance with claim 1, wherein a passage (9.3) for an ejector (17) is formed in the at least one angle compensation element (9.4) and at least one lateral compensation element (9.1, 9.5).

17. The device in accordance with claim 1, wherein a measuring pickup of a measuring system (5, 6) is arranged between two guide rails (2) in the area of the respective carriage (3, 4) for adjusting a carriage position.

* * * * *